United States Patent [19]

Neümann

[11] 4,247,315
[45] Jan. 27, 1981

[54] FILTER ELEMENT

[75] Inventor: Gerhard M. Neümann, Berlin, Fed. Rep. of Germany

[73] Assignee: Delbag-Luftfilter GmbH, Berlin, Fed. Rep. of Germany

[21] Appl. No.: 966,006

[22] Filed: Dec. 4, 1978

[30] Foreign Application Priority Data

Dec. 12, 1977 [DE] Fed. Rep. of Germany ....... 2755964

[51] Int. Cl.³ ............................................. B01D 46/14
[52] U.S. Cl. ........................................ 55/350; 55/478; 55/484; 55/DIG. 9
[58] Field of Search ................... 55/DIG. 9, 350, 484, 55/478

[56] References Cited

U.S. PATENT DOCUMENTS

| 3,354,616 | 11/1967 | Lucas | 55/DIG. 9 |
| 3,690,045 | 9/1972 | Neumann | 55/DIG. 9 |
| 4,061,480 | 12/1977 | Frye et al. | 55/DIG. 9 |

OTHER PUBLICATIONS

SGN Caisson, 23 page bulletin pub. by Nuclear Safety Systems, Inc., 551 Fifth Ave., N.Y. N.Y. 10017.

Primary Examiner—Tim R. Miles
Attorney, Agent, or Firm—Basile, Weintraub & Hanlon

[57] ABSTRACT

A plurality of filter elements which are located in waste containers is disclosed. The filter elements serve for the precipitation of materials which are injurious to health from air streams, and in particular, from air streams in the field of nuclear installations and the disposal of said materials.

9 Claims, 22 Drawing Figures

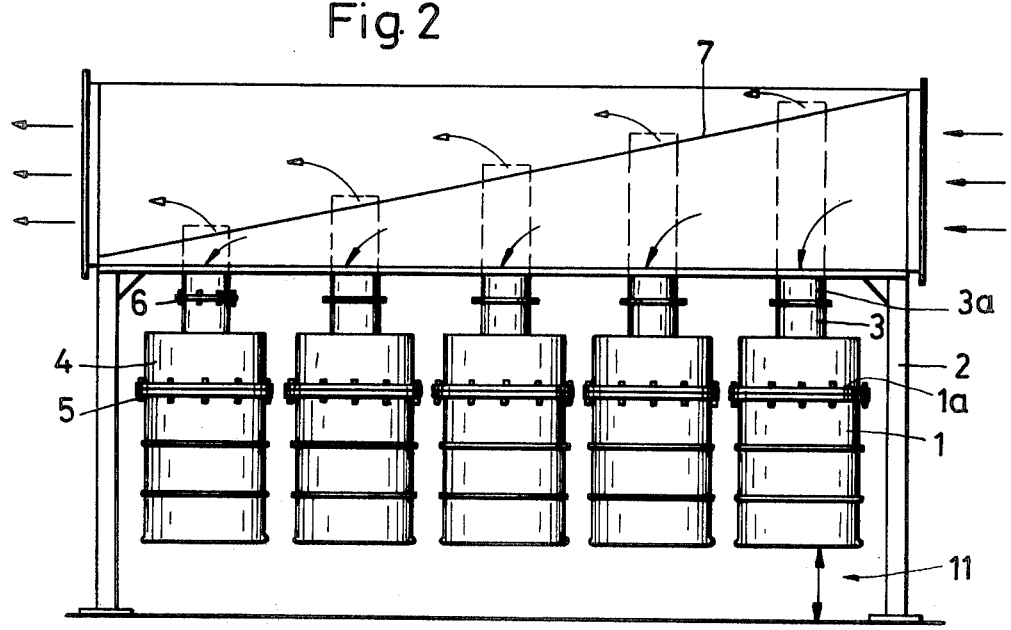
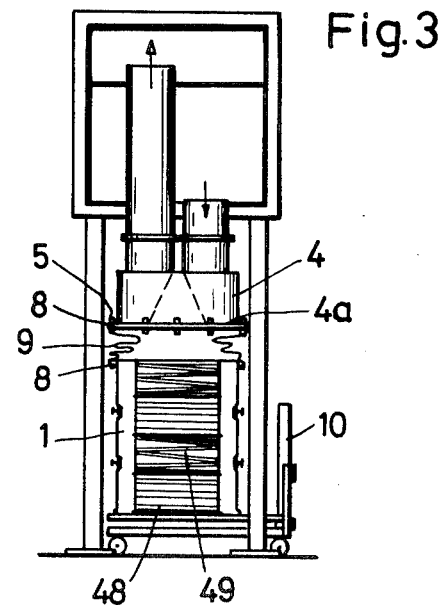

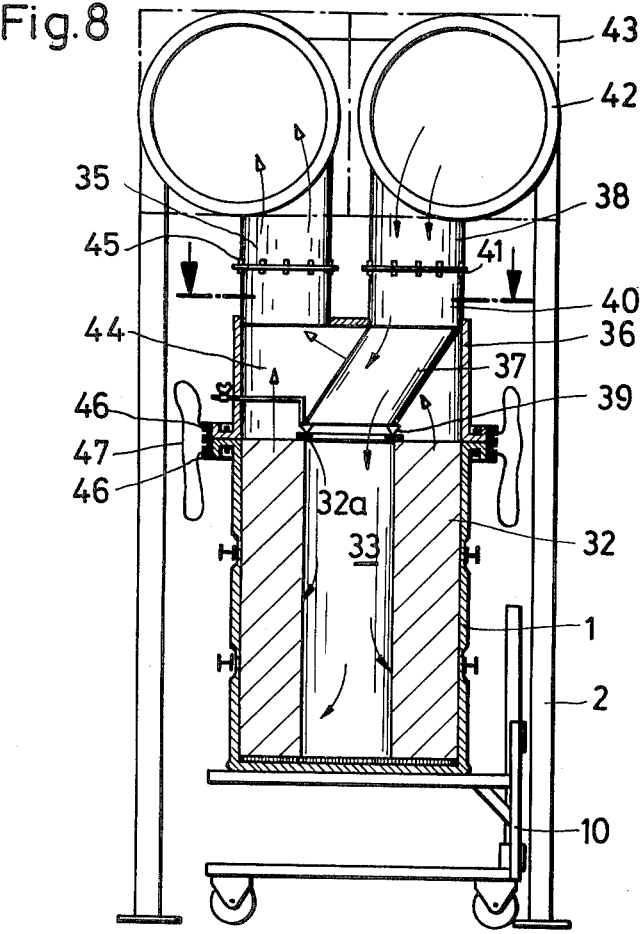
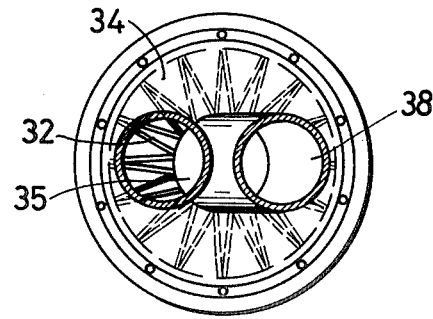

U.S. Patent  Jan. 27, 1981  Sheet 6 of 9  4,247,315
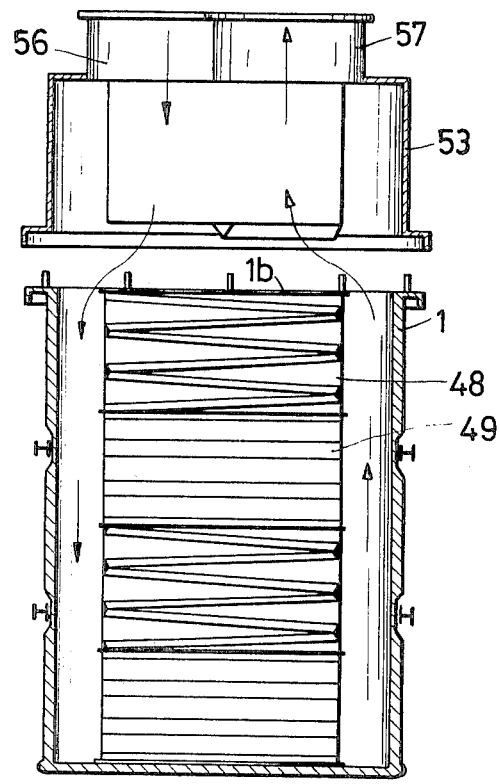
Fig. 10
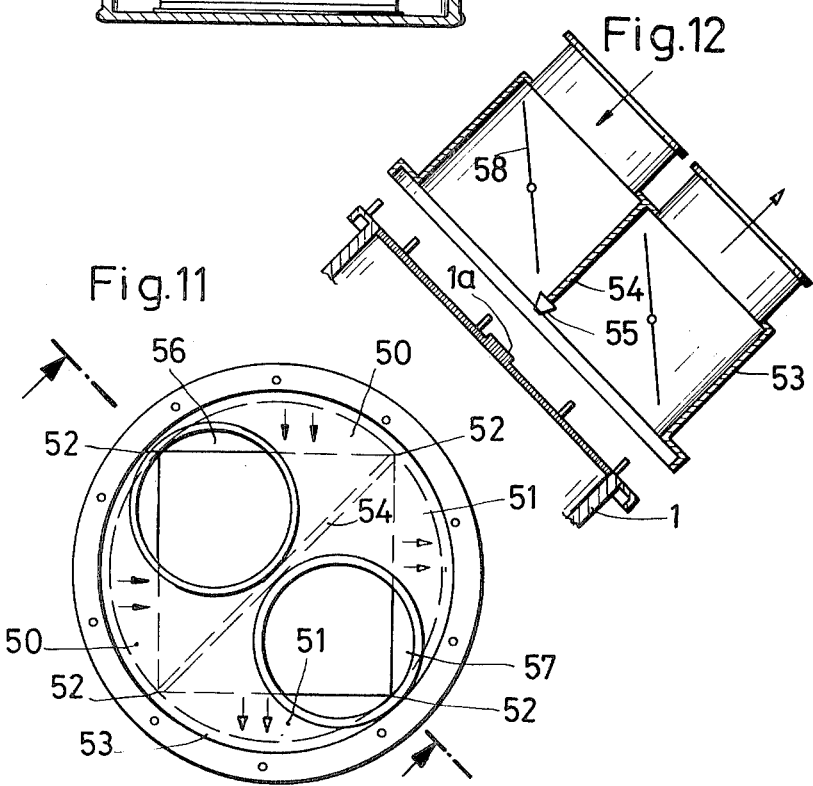
Fig. 11
Fig. 12

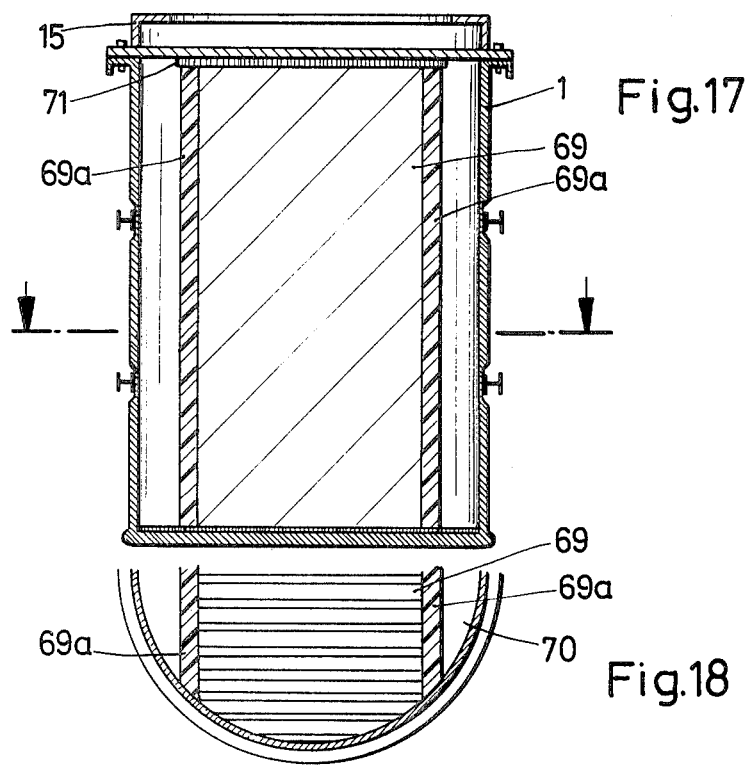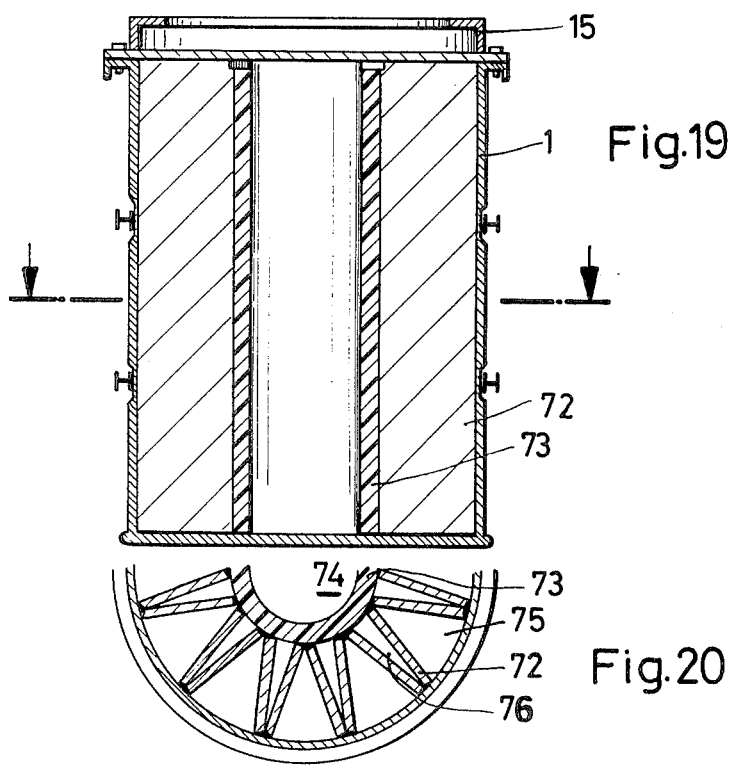

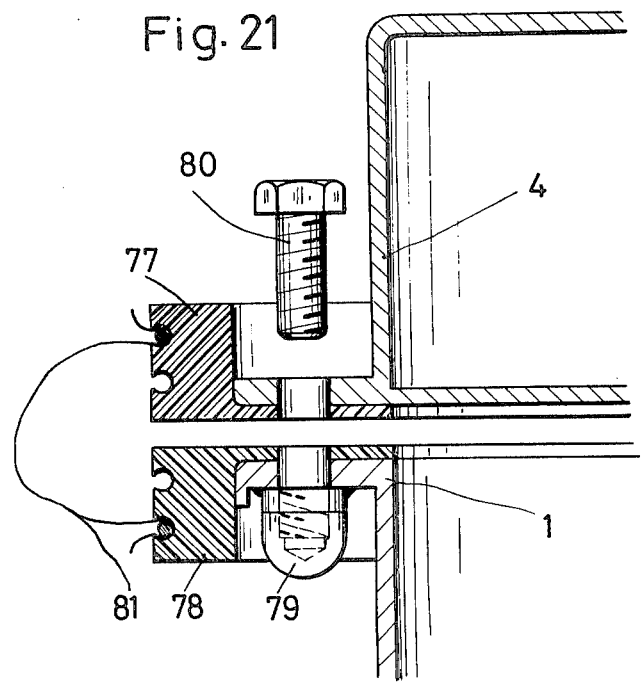
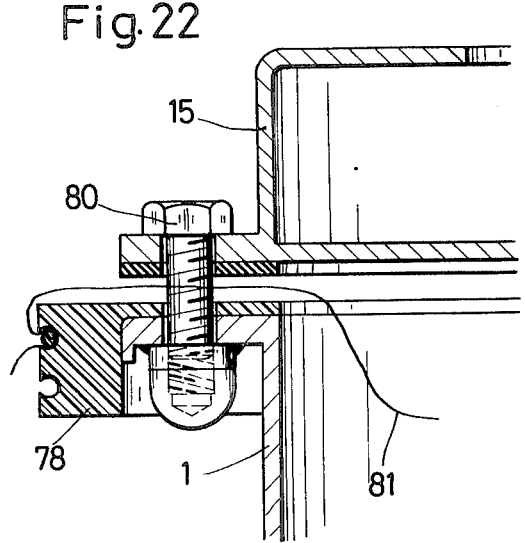

FILTER ELEMENT

BACKGROUND OF THE INVENTION

I. Field of the Invention

The present invention is concerned with filter elements in housings which are equipped with exchange devices. The present invention is also concerned with contamination protection and a method for the precipitation of materials which are injurious to health from the breathing air or processing air. The present invention is especially for ventilating systems wherein the process is connected with the process for comminution and removal of contaminated filter elements for the purpose of long-term storage in preferably subterranean deposits utilizing special waste containers, which waste containers are constructed in a round or angular shape.

II. Description of the Prior Art

In the case of such filter elements which are enriched or saturated with dangerous materials, it is customery, due to the extraordinary long-term effect, either to burn these filter elements at very high temperatures and turn them into ash or to put these filter elements into waste containers after reducing their volume with the application of pressure and to deposit them at subterranean places which are only accessible with difficulty. In either case this disposal method necessitates compliance with especially strict regulations concerning the protection of the environment.

It is known that various methods are utilized to satisfy these requirements; however, most of the removal procedures for contaminated filter elements are influenced to a very substantial extent by the desire to arrange the disposal processes in the most economical way without neglect of the requirements of the legislature. The filter maintenance and the necessary labor at the site of operation, which labor is concerned with the disposal of the filter in addition to the subsequent final removal by combustion or transport to a suitable place of deposit, by means of appropriate devices in compliance with the desired safety requirements, result in an effort which can be calculated in its magnitude and which effort is known to result in substantial expenses for the operator of the type of installation which was described above. Although the disposal expenses are not in any case even closely related to the procurement cost and to the actual usefulness and efficiency of the filter, the desire for safety in this field of application, which is based on legislation, cannot be disregarded.

With regard to the matter described above, the present general state of the art shows two methods for the removal of contaminated filter elements which are especially preferred and which are described in detail as follows:

1. Mechanical reduction of the volume of the contaminated air filter elements by means of shredder installations, impact mills or multiple saw and installations with subsequent compression by means of bailing presses or a pelletizing of the comminuted residual filter parts by means of suitable devices before storage in standardized 200 liter or 400 liter waste containers or waste drums.

2. Mechanical comminution for the disposal process of especially constructed air filter elements after separation of the filter frames, which consist of wood or metal, from the filter media by stamping or multiple separation by means of sawing or pressing. The subsequent mechanical separation of the individual filter parts serves for the direct discharge of those materials which can be oxidized by means of combustion in furnaces (1001° C.), or in the latter case it serves for the centralized or decentralized deposition of the precompressed medium parts in waste containers which are provided for this purpose.

In order to perform such disposal processes, special housings with protective devices for the filter exchange and the appropriate and corresponding air filter elements were developed which, in case of a contamination depending on their type of construction and filter properties, can be exchanged in a more or less clumsy way and, finally, they can be removed as described. Filters with a low degree of contamination where the filter layers consists, for instance, of activated carbon or other absorption media are either equipped into waste containers until the contamination has diminished or they are combusted in appropriate waste combustion furnaces at high temperatures in case of the availability of these devices. All of the housings which should be utilized for this purpose are provided with appropriate filter change devices or filter exchange devices with protective bags, as described above, in order to protect the operating personnel during the exchange of the filter from contaminations or incorporations. For some filter elements construction for the nuclear field is mostly solved in such a way that the actual filter element consists of the rigid frame and a filter paper body in the shape of a compressible insert which can readily be released from the rigid frame. In this case the used filter unit which should be exchanged is first pulled out of the housing and is then separated from the rigid outer frame inside a transparent protective bag by means of a tear string. Following this, the volume of the contaminated parts is reduced in the known way by means of a crushing process or pressing process or by means of a sawing device or in a shredder or in an impact mill as a phase of preparation for the waste disposal, which is the next step. Prior to the process of filling, pouring or combustion, such filters must be comminuted to a fraction of their original volume for reasons of space usage. In many cases the remaining rigid filter frame, in case of a radioactive contamination, can be decontaminated and can be reused for the same purpose after some time.

A similar version is known in the U.S.A. In this case each of the angular filter elements consists of four tube-shaped parts of a block which are glued together or sealed or which can be compressed and which, as independent functional units, can be separated from each other, if this is necessary, by a stamping process and can be mechanically compressed.

Since the bulky and angular filter elements which were used to date could be placed after use, for the purpose of transport, into the round standard waste containers, only after they had been sawed apart or by making allowance for other difficulties as far as compression and comminution are concerned, and even then only with difficulty, there was a continuous search for new or similar solutions to the problem in order to be able to perform a simple and economical filter waste disposal without contamination of the environment.

The current state of the art is mainly critized for the unreasonably high expenditure for manual and mechanical pretreatment, and it is further critized for the very expensive processing devices and the protective measures which have to be used in order to be able to perform the described removal processes in an economical and space-saving way.

This complex situation is even more aggravated by the fact that the filter industry to date has usually manufactured angular filters for economical reasons in order to please the consumer; however, the barrel-shaped waste containers into which the used filters should be put after contamination are, in a completely contrasting way, manufactured in the form of a circle, also for reasons of economy and for some other undoubtfully advantageous reasons. However, this discrepancy in its entire magnitude is only completed by the inner measurements of the internationally standardized waste containers which are much too small as compared with the standardized outer measurements of the angular filter bodies which are customary and enjoy a worldwide distribution.

This situation could, of course, in a simple way be remedied in such a way that in the future the round waste containers will be manufactured somewhat larger or in a fitting shape, that is, in an angular shape or in a quadratic shape. On the other hand, it is still possible to manufacture the housings and the filter bodies in circular shape and in matching measurements with respect to the round waste containers in order to achieve an agreement; however, a more detailed examination has shown that the manufacture of angular containers is substantially more complicated and more expensive than the manufacturing of containers as they were up to date, especially if the same strength data and pressure data are desired for angular or box-shaped containers as for the round shapes of construction which were used to date. In addition, the cost for the manufacturing of the filters is increased if round filter elements should be utilized which would match the round containers instead of the use of the angular filter bodies; however, since for decades thousands of filter installations were used which were constructed, based on the angular or quadratic filter element dimensions which are internationally customary, a general conversion to the round air filter bodies in the future by the operators of filter installations is possible only if allowance can be made for high changeover costs and high investment costs concerning the existing air filter installations as well as the higher prices for filters. The same problem exists for the 200 liter standarized waste containers of round shape for the reception of contaminated filter wastes which are internationally customary to date. The 400 liter containers with their larger diameters were, in most cases, so far only used so that the 200 liter waste containers could be placed in them and sealed with concrete. For the intended purpose of placing the filter in these 400 liter containers for waste deposit, these containers would possibly be too expensive, since in the case of sealing with concrete a still larger container would then be necessary. Another reason for not changing the shape of the filter elements or the containers is the fact that the existing technical installations for the operation and maintenance of the existing removal installations, such as telekinetic manipulators or air locks, have been matched to the described types of constructions and dimensions for years and it would be very difficult to change this. The operators of nuclear installations as well as the manufacturers of containers, air filters and housings are presented with the same multiple cost problems which would occur if this situation should be changed in a rapid and general manner.

In this context it should also be mentioned that the contaminated waste of a nuclear installation which should be removed by means of oxidation or by means of deposition of course not always consists of used filter elements, but rather to a much larger extent it consists of various other materials which are part of the nuclear process and which have to be removed as waste. This also seems to be the reason for the fact that the disposal aspect of the filters is probably not taken serious enough.

The regulations concerning environmental matters, disposal matters and deposit matters have now become more strict. In some cases the cost for the maintenance of such installations has increased to such an extent due to new regulations that sometimes the entire technical process has been seriously reconsidered with regard to its economical aspects.

This is the reason why, at least as far as the filters are concerned, solutions to this problem are necessary which to begin with should be characterized by economic considerations, especially as far as the planning of such installations is concerned. The volume reduction installations and the comminution installations which were described above, such as, for instance, impact mills, separating devices, saws, shredder installations or bailing presses, necessitate the availability of large indoor spaces and rooms where these devices can be installed and which rooms are safeguarded with air locks and which rooms must be further safeguarded air tight and radiation protected with regard to the atmosphere. Furthermore, remote control devices are necessary which will start and control the mechanical process for the reduction of the volume and for the compression of contaminated filters in which case, of course, occasional repairs of contaminated machine parts should not be excluded.

The present state of the art of the comminution possibilities and compression possibilities of contaminated filter elements results, at best, in the reduction of volume of a ratio of 1:3. The extent to which the waste containers are filled independent of their capacity in liters is of an order of magnitude of maximum 65% to 70%, due to the very loose waste material and the volume of air that is entrapped in the filter material. Therefore, a complete utilization of the container volume in spite of the solidification is, at least, presently not yet possible. Whether in the near future a significant improvement can be achieved at all, considering the present state of the art of disposal of contaminated filter elements, is not clear at the present time.

SUMMARY OF THE INVENTION

For the reasons which were explained above, the present invention is based on the objective first of all to circumvent the multitude of the described processes for the reduction of the volume of contaminated filters completely to simplify the exchange technique and the necessary maintenance protection and the expenditures connected with the handling of contaminated filter bodies and to create the technical basis for the disposal of filters by means of standardized, round, commercially available, regular waste containers which will result in a substantial reduction of the entire technical and financial expenditures, even for the higher pressure range, without a reduction in the present degree of utilization or degree of filling of the volume of the waste containers.

This objective is met according to the invention and according to the basic principle of the device and the operating method of the invention in such a way that appropriately shaped filter elements are received by such housings which consist of international, commercially available, 200 to 400 liter capacity, standardized waste containers for the nuclear industry which are equipped with sealable, standardized lids and which are suitable for the manipulator technique and air lock technique which, without a change of their physical appearance, fill the complete height of the container and the entire volume of the container up to an extent of over 65% with compact filter layers. The filter layers are distributed uniformly over the entire inner cross-section of the container, or are offset with reference to each other, or which filter layers are located one on top of each other, and which filter layers consist of pocket-type filter paper or granular bulk material in the shape of plates, locks, boards, discs, rings, stars or zig-zag where, during the working phase of the filter, the waste containers are freely suspended at the filter installation with some distance to the floor. Above each waste container a domed lid is put after removal of the standard lid, which domed lid is equipped with cube flanges at both sides of the air entrance and the air exit, and with test grooves. The domed lid can be tightly connected with the waste container and the inserted filter element by means of detachable screw devices or with remote control elements which activate lever systems. The domed lid is connected by means of flanges with one of each air current carrying dusty-air channel or clean-air channel, which channels can be located one on top of the other or one next to the other. For for the performance of a contamination free, manual filter exchange by means of a transparent, protective tube connection between the container flange and the domed lid flange at each part a circumventing, self-fastening, elastic, known rim with multiple grooves is located, into which grooves the elastic protective tube connection can be squeezed in a known way. During the exchange phase each of the waste containers can be removed and lowered from the air channel in the range between the floor and the container or can be lifted up to the air channel in order to be connected with it by means of bolts and where the lifting and lowering of the waste container is performed by means of a lift truck.

In order to use such a filter element in a housing with an exchange device in accordance with the further modification of the invention by way of the correct method, it is necessary that before the exchange of the filter elements the throttle valves of the fresh-air tubes and the exhaust-air tubes, which valves can be activated with levers, are at first closed at the filter installation with the support; and that after removal and lowering of the waste containers from the filter installation to the floor or onto a movable transport cart or lift truck the protective hose, which connects the domed lid and the waste container, is pulled apart and in its middle section is sealed and separated. Only then the final covering or closing of the waste container is performed by means of the appropriate standardized lid, which is screwed on with simultaneous enclosure of the sealed-off protective tube and the used filter body, which is now inside the container.

The above objective is furthermore solved by the present invention by the fact that the standardized waste container in its entire height is filled, for instance, with an air or gas cleaning granular bulk material layer in such a way that approximately 25% to 35% of the container cross-section of filter-free, free space remains to the right and to the left of the filter layer as a space for the supply air and for the exhaust air. The domed lid, which is connected to an airstream carrying channel system of the filter installation, and which domed lid is optionally equipped with remote control elements (for instance, hydraulic cylinders), is divided inside by means of a roof-shaped separation with a test groove device into one dusty-air space and one clean-air space, which are tightly sealed. Directly connected to this are tube connections with throttle valves, which throttle valves can optionally be remote controlled by means of lifting cylinders and where in case of the filter exchange the throttle valves are closed, the lifting cylinders with the layer system are opened for the purpose of the removal of the cap-shaped domed lid with beveled lid edge and gasket from the waste container. The lifting cylinder at the bottom places the container onto an automatic set of roller skids which are located horizontally and which can optionally be lifted up or lowered onto two movable conveyor belts for transport after the standardized lid has been put on the container automatically.

It is furthermore of importance for the further development in refinement of the invention that the standardized waste container, which can be lowered from a filter installation, is filled to more than 65% with a filter layer which is arranged in a star shape, such as for instance with large area folding filter paper pockets which are arranged around a hollow, cylindrical, air entry cross-section. The air current on the clean-air side is passed between the filter pockets from below to the top through a domed lid, which domed lid is equipped from the inside with a supply air tube for the dusty air which is positioned in a slanted fashion within the space of the lid. The one end of the supply air tube is equipped with a closable test groove and is connected tightly to the filter element during the operation phase, whereas the other end of the tube which extends through the upper lid wall is tightly connected via a flange connection with round or angular tube. The exhaust air is removed from the domed lid directly via a tube connection, and where for the contamination free filter exchange the container and the domed lid are each equipped with a rim, into which rim a transparent protective tube can be squeezed.

The basic idea of the invention is furthermore defined by the fact that the inner space of the standardized waste container is in its full height filled with at least four quadratic, zig-zag filter packages in the shape of pockets, which are alternately layered one on top of the other in such a way that in each case two free spaces for the supply airstream and for the exhaust airstream are created in the cross-section of the container. The free spaces are located one opposite of the other where it is necessary to seal all four corners of the filter package at the wall of the container with a sealant compound in such a way that, when the container is covered with the domed lid, a seal is automatically created at the filter package, which seal runs centrally and diagonally through the domed lid and which seal is created due to the presence of a test groove which separates the dusty-air space from the clean-air space, and the possibility exists to connect it with an air supply channel or an exhaust air channel by means of two tubes which are equipped with throttle valves.

In a further modification and refinement of the solution of the problem on which the invention is based, the inner space in the full height of the standardized waste container is filled, for example, with a rectangular, board-shaped, compact, zig-zag, folding filter package in the form of pockets which is uniformly layered with one layer on top of the other layer and in such a way that at least 65% of the volume of the container is utilized for this purpose above each waste container a hat-shaped domed lid is located. Both are connected with each other with multiple grooved rims and a protective tube which after latching with the container separates the clean-air space from the dusty-air space in a gas-tight fashion by means of a roof-shaped and square-shaped separating part, which is located on the inside of the lid part, and by means of a closable test groove device on the rectangular, board-shaped filter package, and by means of an elastic gasket, whereas two sides of the container cross-section which are located one opposite the other are closed and the other sides are open with reference to the filter package.

Another characteristic of the process of the invention is the mode of operation after the filter has been used. In this case it is significant that the waste container, which is filled with the rectangular, board-shaped, used filter pocket package and the gasket after its removal from the domed lid of the installation and in case of contamination, is connected with bolts to a standardized lid which fits the container tightly. The remaining free spaces could still be filled with additional contaminated waste products of the nuclear processing type before the container is finally closed. The filled container with the bolted-on, standardized lid is then ready for transport.

In order to achieve a complete utilization of the details of the invention, it is furthermore necessary that the star-shaped package of filter pockets with the prefilter layer in the shaped of a hollow cylinder which was placed into the waste container is closed at the top and at the bottom of the V-shaped sides of the pockets, and the remaining free spaces can be used for the passing of exhaust air, if additional other contaminated materials should be placed into the container for their disposal.

Finally, according to a further modification and refinement of the claimed subject, the basic construction of the invention is furthermore influenced by the fact that in order to avoid damage to the protective tube during the exchange of the filter, the bottom portion of the waste container edge is equipped with tightly welded cover nuts, which are closed at the bottom, instead of the commercial spacer bolts, and the domed lid with the rim or the optional standarized lid without rim is attached to the edge of the container with bolts, thereby enclosing the contaminated protective bag and the contaminated filter, and where the rim which is located at the edge of the container can directly be transported to a deposit site together with the waste container as a disposal part or as a long-term deposit part in case of disposal.

BRIEF DESCRIPTION OF THE DRAWINGS

The details of the invention are shown in the form of example of embodiments of the invention in the drawings and are described in detail below:

FIG. 2 elucidates and illustrates in a frontal view the position of the waste container filter units which are suspended in series and the location of the supply air tubes and the exhaust air tubes at the dusty-air channels and the clear-air channels of the air filter installation.

FIG. 3 shows the basic principle of the waste container filters with a lift truck below in the form of a side view, and it shows furthermore a cross-section of the upper duct part.

FIG. 7 does not show the air channel support structure and gravity roller conveyor. FIG. 7 shows the supply air tubes and the exhaust air tubes in cross-section.

FIG. 8 shows the connection of the container filter with round tube ducts for higher operating pressures with a lift truck that was placed below the assembly, and it shows the arrangement of the rims for the protective tubes and their maintenance devices at the container and at the container attachment in the shape of a domed lid. The angular ducts which are shown dash-dotted are optional.

FIG. 9 shows a top view of FIG. 8; however, the tube ducts and the support structure are not shown. In this case the filter layer is arranged in star shape with zig-zag filter package in V-pocket form in the waste container. A cross-section of the supply air tubes and the exhaust air tubes is shown.

FIG. 10 shows, as an example of the embodiment of the invention, a waste container with zig-zag filter elements which are placed one on top of the other and offset by 90° with reference to each other and also a matching container lid in the shape of a hat which can be put on top of the container, which lid is equipped with both connecting tubes and with a test groove for the checking of tightness, which test groove extends diagonally across the filter package.

FIG. 11 shows as a top view the position of the filter element in the container and the remaining free spaces with both the connecting tubes for the dusty-air side and the clean-air side for the passing of the air, and it shows furthermore the direction of the flow of the dusty air and the clean air.

FIG. 12 is a cross-section of the top view of the container and the domed lid according to FIG. 11 which indicates the centrally located lock bar with the test groove seal and the throttle valves which are located in the connecting tubes.

FIG. 17 is a cross-section of a waste container into which a filter layer was placed, which filter layer was shaped like an angular block. The clean-air side and the dusty-air side are covered by other filter layers. FIG. 17 shows furthermore the remaining free spaces of the waste container as well as a standarized lid, which was bolted to the waste container in the closed position prior to its transport to the site of deposit.

FIG. 18 shows a cross-section through the container according to FIG. 17, and it indicates the position of the filter layer.

FIG. 19 shows a waste container in cross-section which was equipped with a standarized lid and a filter layer which was positioned in a star shape in the waste container, which filter layer is equipped with an additional, cylindrical, prefilter layer inside at the hollow dusty-air side. The waste container is shown in the closed position.

FIG. 20 shows, as a top view of the container according to FIG. 19, a cross-section of the waste container with the indicated cylindrical prefilter layer and the star-shaped fine filter layer. The free spaces which are available for the supply airstream and the exhaust airstream after the passing through the filter can be seen.

FIG. 21 is a drawing of the connection between the domed lid and the waste container where the multiple groove rim arrangement for the filter change technique, the protective tube connection and the flange connection with bolts are shown in special detail.

DESCRIPTION OF THE PREFERRED EMBODIMENT

Figure 1:
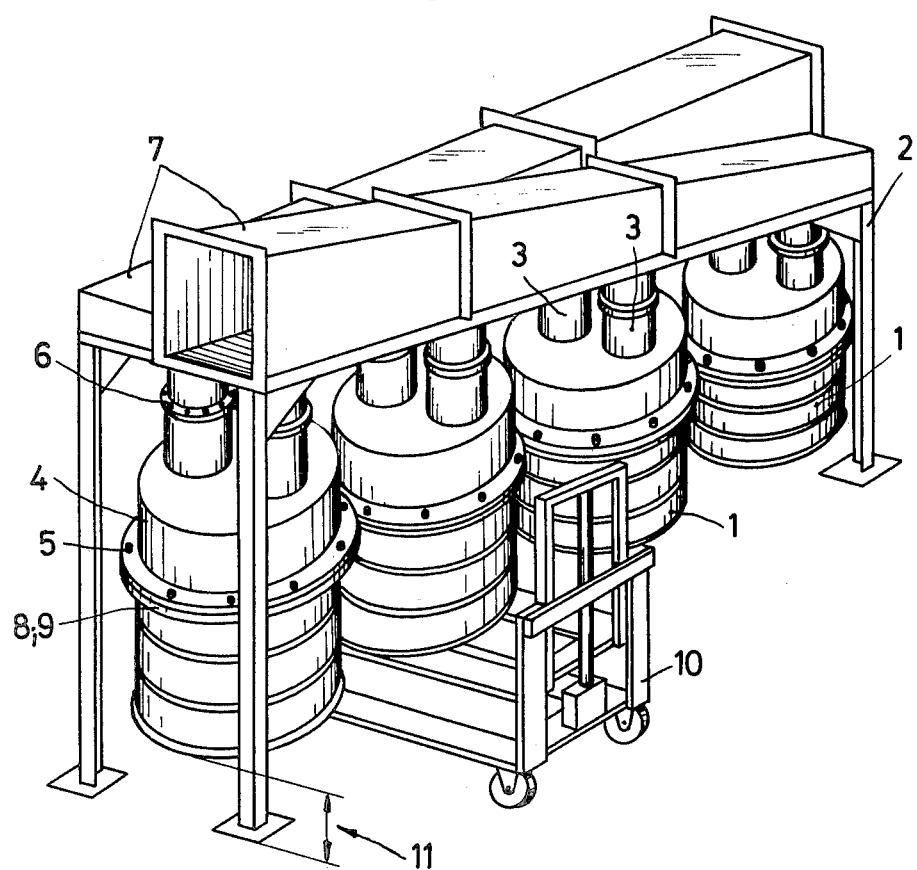
FIG. 1 is a perspective drawing of a general overview of the complete air filter installation with the filter housings, supply air ducts and exhaust air ducts and with a lift truck.

The filter installation according to FIG. 1 shows in detail that the filter elements, which are sealed in the waste containers 1 and which are not shown, are directly connected to supply air ducts and the exhaust air ducts 7 by means of the domed lids 4 and the tube connections 3 and the flanges 6. The support structures 2 for the supply air ducts and exhaust air ducts 7 are of such height that a space 11 is formed under the freely suspended waste containers 1, which space 11 makes it possible that during the filter exchange phase and before the filter exchange phase, a movable lift truck 10 can be pushed under each of the waste containers 1 to be exchanged. After the removal of the tightening elements or connecting elements 5, the waste container 1 is lowered from the stationary domed lid 4 to the floor by means of the lift truck 10. In this way the protective tube, which is squeezed in by strings and which is not shown, is pulled apart between the rims 8 and 9 in such a way that the known sealing process and separating process can be performed for the purpose of the sealing of the domed lid 4 and the container 1.

It is unequivocally evident from FIG. 2 that in this way a row of waste containers 1, which are equipped with filter elements and which are connected in series or in a parallel fashion, can be arranged directly below air ducts 7, which air ducts are appropriately supported with a support structure 2. The exhaust air tubes 3 partially penetrate the supply air duct 7, whereas the tube connections 3a which are located on the domed lids 4 at the supply air side are only tightly sealed and connected to the corresponding bottom part of the duct. A reverse arrangement is also conceivable such that the connecting tubes 3 and 3a are connected to the air ducts 7.

FIG. 3 shows a waste container 1 with the filter elements 48 and 49 which are located offset with reference to each other, which waste container 1 was already removed from the domed lid 4 and lowered by means of the lift truck 10. During this process the tightening elements or connecting elements 5 remain at the circumventing flange of the stationary domed lid 4. The protective tube 9, which is pulled apart and extends between both the rims 8, can then be separated in an air-tight fashion by means of a sealing and separating device.

Figure 4:
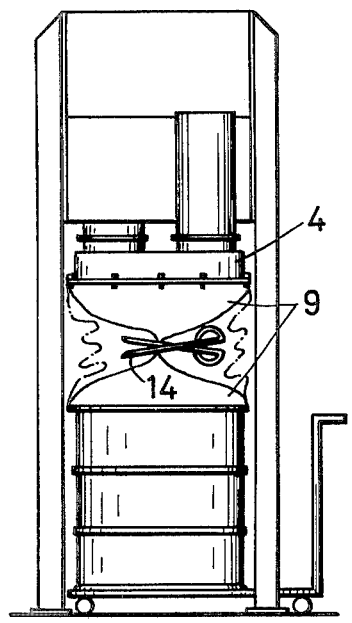
FIG. 4 shows a lowered waste container with a built-in filter below the filter installation, and it characterizes the exchange process utilizing the protective tube technique by means of sealing and separating for the separate sealing of the domed lid and of the container.
Figure 5:
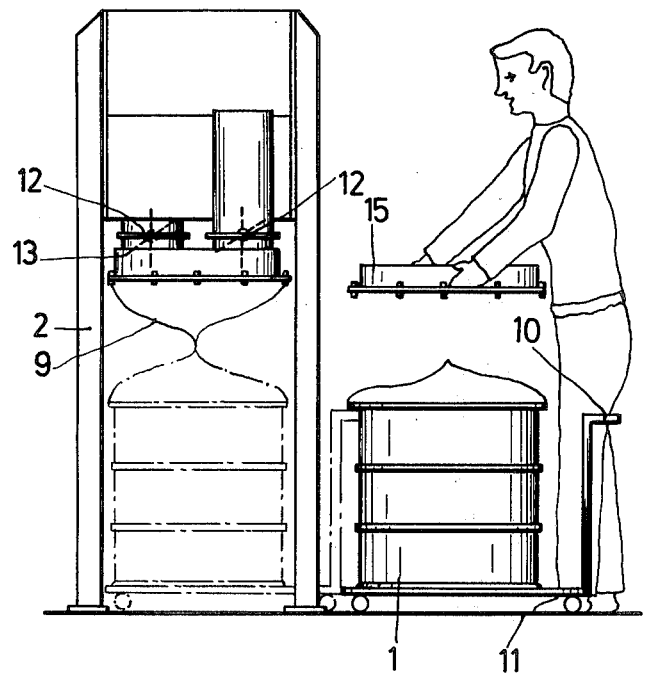
FIG. 5 shows the waste container with the used filter at a distance from the filter installation after a lateral move with the lift truck, whereas the filter installation with the domed lid and the container are still closed by the protective tube connection. The waste container is closed as shown in the drawing with the appropriate standarized lid and without removal of the protective tube and the filter element which is contained in the protective tube.

Such a necessary separating device 14 for the separation of the protective tube 9 during the filter exchange is indicated in FIG. 4, whereas FIG. 5 should show the situation that exists if the throttle valves 13 are closed by means of the levers 12 and the waste container 1 with the lift truck 10 is pulled away laterally from the filter installation 2 in the area of the floor 11. The remainder of the tube 9 at the domed lid 4 is pulled into the new protective tube 9, by hand grasping the remainder of old tube between a pinched portion of the new protective tube 9 which new protective tube is attached to the rims of the container 1 and the domed lid 4 after a new filter container 1 is placed under the domed lid 4. The used container 1 is closed by means of a standarized lid 15, and the container is then ready for shipping.

Figure 6:
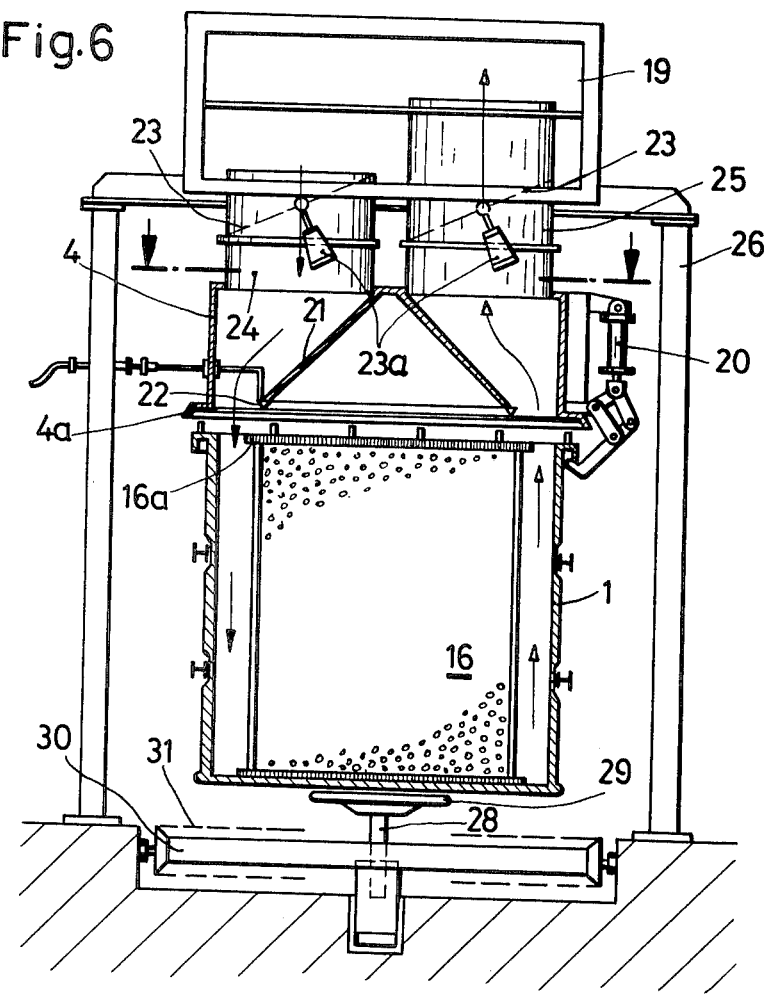
FIG. 6 shows a possibility for the operation of a remote controlled mechanized filter installation with bulk material filter layers in waste containers on a gravity roller conveyor by means of appropriate lifting cylinders and pressure cylinders at the individual devices during the filter exchange process in a completely automatic fashion without the use of telekinetic manipulators. A test groove device for the checking of the tight connection between the filter body, the container and the domed lid, which can be operated and closed by remote control, is shown in the upper part of the container attachment.

FIG. 6 shows a completely automatic version of the filter element in accordance with the invention which can be operated by remote control, and FIG. 6 shows further the waste containers 1. Such a solution is especially perferred in such areas of application which are characterized by very extensive contamination, such as, for instance, in hot cells. The waste container 1 with the filter layer 16, which was poured into it, is pressed against the domed lid 4 in an air-tight manner by means of leveraged tightening devices 20 (for instance, hydraulic cylinders), which domed lid 4 is equipped with a funnel-shaped, circumventive edge cover 4a. In this way the test groove device 22 of the domed lid 4 partially penetrates the elastic gasket 16a of the filter layer 16 which was poured or filled into the container 1. The domed lid 4 separates the dusty-air side from the clean-air side by means of a roof-shaped separation piece 21, and in this way the waste container 1 is, together with the lid edge gasket 4a, sealed from the surrounding air. During the operation of the filter the throttle valves 23 in the connecting tube 24 and 25, which are located on the supply air side and on the exhaust air side, respectively, on the domed lid 4, are opened by means of the tightening elements 23a (for instance, hydraulic cylinders). The filter exchange of the used and contaminated filter layer 16 in the container 1 is performed in sequence, as described below:

The tightening elements 23 are shifted by means of remote control to the closed position of the throttle valves 23. The clean-air duct and dusty-air duct 19 is therefore hermetically sealed. Then, all three leveraged tightening elements 20 at the domed lid 4 are unlatched. In this way the container 1 with the filter layer 16 can be freely moved in a downward, vertical direction. In this way the extended lifting cylinder 28 with the pressure lid 29 which is located under the container 1 is subjected to a load, and finally the lifting cylinder is shifted downward to such an extent by the release of a paralysis circuit until the container 1 is positioned on a dual conveyor belt or on a powered roller conveyor 30. In this way the waste container 1, including its used contents and after it has been closed with the standardized lid 15, can automatically be moved horizontally to its discharge position. Prior to the start-up of a new container with a new filter layer, the sequence of operation steps is carried out in the reverse order of sequence. During this procedure a remote controlled last check for tightness between filter 16 and the domed lid 4 and, on the other hand, a check of the seal between the clean-air space 24 and dusty-air space 25 by means of the test groove device 22 can be performed as it was practiced in a known way to date. Simultaneously, the tightening effect of the tightening elements 20 can also be checked. The conveyor belt 31 or the entire roller conveyor 30 can also be vertically moved instead of the lifting cylinder 28.

Figure 7:
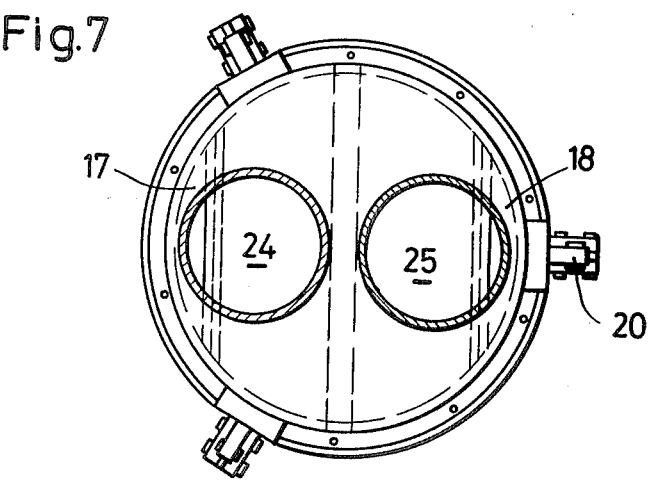
FIG. 7 is a top view of the container filter according to FIG. 6 which can be operated by remote control.

FIG. 7 shows the free spaces 17 and 18, which remain between the filter layer and which are necessary for the passing of the supply air and exhaust air via the connecting tubes 24 and 25. In addition, FIG. 7 shows the arrangement of the tightening elements 20 and the domed lid 4.

Another modification of the container filter is evident from FIG. 8, as well as from the cross-sectioned top view according to FIG. 9. In accordance with these figures the filters installation consists, first of all, of round tubes 42 which are located close to each other, or it consists of angular supply air ducts and exhaust air ducts 43 which are arranged on a support frame 2. Connected to this via the flange connections 41 and 45 are the connecting tubes 35 and 38, the domed lid 36, and the waste container 1 which is attached to it. The domed lid 36 is equipped with a piece of tubing 37 for the passing of the supply air, which piece of tubing 37 extends in a slanted position through the space inside the lid. The piece of tubing 37 is equipped at its lower end with a circumventive, completely round test groove device 39, which in its tightened condition contacts the filter layer 32 and its gasket 32a. The filter layer 32, which is contained in the waste container 1, consists of a zig-zag shaped pocket filter layer 32 which is arranged in a star-shaped pattern around a hollow cylinder 33. As an option, the filter layer 32 can also consist of high-quality filter paper. The dusty air passes from the tube 40 and 42 or 43 through the entire space of the domed lid 36 to the filter 32, and after the cleaning process it is passed from this point through the free space in the lid 44 into the exhaust air pipe 35. At the edge of the domed lid 36 and at the edge of the waste container 1, one circumventive multigroove rim 46 is attached, as shown in FIG. 8, into which rim 46 a clear protective tube 47 is squeezed by means of strings which are inserted, and which protective tube 47 is of sufficient length for the exchange process. In this case the waste container 1 is also lowered by means of a movable lift truck 10 during the exchange process after removal of the tightening elements until the protective tube 47 is unfolded to such an extent that it can be sealed and separated to form two halves.

As another characteristic, FIG. 10 shows as a drawing a block or board-shaped filter insert in a waste container 1 in which case, for instance, four zig-zag pocket filter packages 48 and 49, which are of the same size, are alternately layered one on top of the other in such a way that at least 65% of the container is filled. In this way two exhaust sides are created for each two supply air sides, which are located diagonally. The two exhaust sides are the optimally utilized free spaces 50 and 51 at four sides of the container space 1, which are shaped like the segments of a circle and which are utilized for the pasing of the supply air and the exhaust air, which airstream is passed through both of the connecting tubes 56 and 57 and through the domed lid 53, the directions of which are currents are counter-current with reference to each other.

It is evident from the drawings of FIG. 11 and FIG. 12 in which way the dusty-air space 56 is separated by means of a straight test groove bar 54 from the clean-air space 57 in the domed lid 53 diagonally from one edge to the other edge of the filter package 48 and 49. The corners or edges, respectively, of the filter layer 48 and 49 which contact the inner edge of the container are each sealed by a special seal 52.

FIG. 12 shows again in detail as a cross-section of the domed lid 53 the throttle valves 58 and the vertical separating bar 54 with the test groove 55 between the clean-air space and the dusty-air space. The corresponding container cross-section with the container 1 characterizes the position of the filter element gasket 1a on the filter layer.

The drawings of the FIGS. 13, 14, 15 and 16 show still another modification of a filter element in a waste container. This is a filter package 59 which has been uniformly layered in a zig-zag fashion, one layer on top of the other, where the airstream passes in the shape of the letter U through the filter layer 59 and the container 1.

Figure 13:
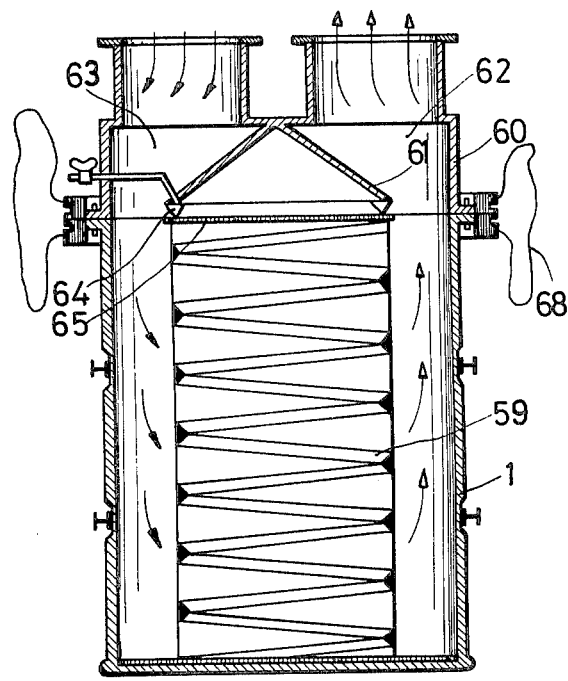
FIG. 13 shows a waste container with a pocket filter layer which was placed in the container in a zig-zag shape, and it elucidates and illustrates the tightly sealed separation of the dusty-air side and the clean-air side in the inner part of the domed lid by means of a roof-shaped separating part with test grooves, and it shows simultaneously the direction of the air flow and the location of the rims and the maintenance device as well as the protective tube device.
Figure 16:
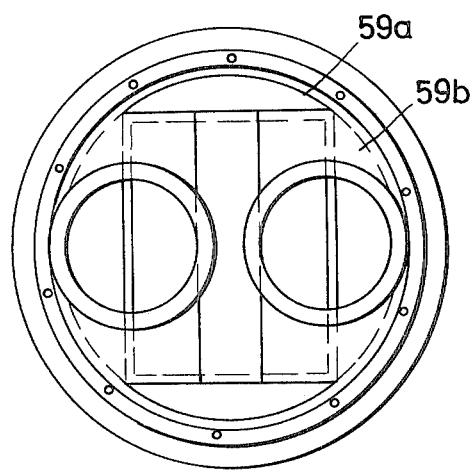
FIG. 16 is a top view of the container according to FIG. 15 and elucidates the position of another filter package variation.

FIGS. 13 and 16 show in the domed lid 60 the roof-shaped division 61 with adjoining test groove device 64 which exerts a pressure on the gasket 65 of the filter package 59 after the device has been assembled.

FIG. 16 shows free spaces at the filter package which are separated from the outer air and which are hatched black.

Figure 14:
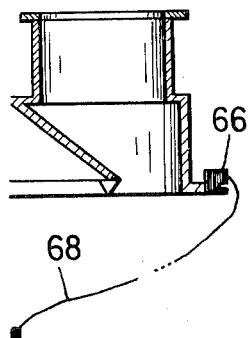
FIGS. 14 and 15 shows a lid which was separated from the container with the sealed protective tube during the maintenance phase.
Figure 15:
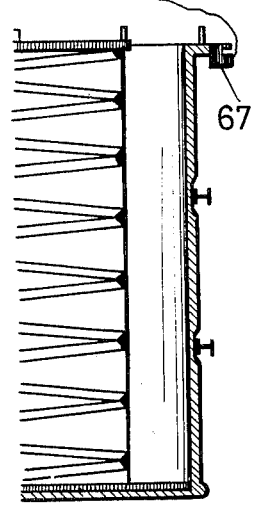

FIGS. 14 and 15 should show and elucidate the position of the multiple groove rims 66 and 67 and the condition of the sealed protective tube 68 after the container and the domed lid have been pulled apart.

FIGS. 17, 18, 19 and 20 are cross-sections of both of the basic waste container filter layer systems and, that is, in one case in the form of a granular bulk material 69 or as a upper filter block, and in case of the other version in the form of a star-shaped, folding paper filter 72 with a cylindrical, three filter layer 73 which was inserted on the dusty-air side. Both of the waste container systems, according to FIGS. 17 and 19, are closed with a commercial, standarized lid 15 for the purpose of delivery as well as for the purpose of transport for disposal.

In case of the example as shown in FIG. 17, a tightly folded paper filter layer 69a can be arranged before and after the filter layer for the purpose of prefiltering and refiltering in addition to the granular bulk material layer 60 with the gasket 71.

FIG. 18 is a drawing of a cross-section of the container 1 with the filter layers 69 and 69a and the free spaces 70.

FIG. 20 shows the remaining free spaces in the waste container 1 for the clean-air exhaust 75. The V-shaped filter pocket covers 76, which are hatched black, result necessarily in a passing of the air through the filter plates 72 into the clean-air spaces 75. The hollow cylinder 74 with the prefilter layer 73 represents, in this case, the air supply side or the dusty-air side.

FIG. 21 is the drawing of a cross-section which mainly shows the actual attachment of the multi-groove rims 77 and 78 at the domed lid 4 and at the waste container 1. In order not to damage the protective tube 81 during the maintenance, preferably cover nuts or blank nuts 79 are tightly welded below and around the container edge 1 for the reception of the bolts 80.

FIG. 22 shows how the bolts 80 are passed through the domed lid 15 and through the contaminated protective tube 81 and how the bolts 80 are tightly screwed to the container 1. In this case the rim 78 remains at the container 1 and is not removed for the final deposit. This construction ensures that the contaminated protective tube 81 and the contaminated filter element are packed contamination protected in container 1 and that contaminated material cannot enter the environment.

The advantages which can be achieved with the invention consist especially in the fact that the waste containers, which anyhow to a large extent in case of an intended final deposition are looked upon as packaging for the contaminated filter wastes, can simultaneously be used as one-way filter housings.

In addition to this increased efficiency and degree of utilization of the waste containers and disposal containers, the connecting installations for waste container filters can also be manufactured in a substantially more space saving and simple fashion, and they can be manufactured from normal tube ducts or air ducts.

In addition to the simple and extremely safe filter exchange technique and container exchange technique, there are still substantial savings of investment costs for the operator of nuclear installations because the procurement of special housings for the filter elements with tightening devices and maintenance protection is eliminated due to the placement of waste containers or disposal containers. The handling of the filter exchange process, which was necessary to date and which required a lot of expenditures and effort with the subsequent extensive additional operations for the disposal of the contaminated filters in order to encapsulate these contaminated filters finally in compacted form into the waste containers which were to be deposited, is also eliminated.

According to the present state of the art of the technique of mechanical comminution of contaminated filters for the purpose of waste disposal, a reduction in volume of maximum 1:3 can be achieved; however, in practice a filter element with the dimensions 610 by 610 by 292 millimeters with an air passage capacity of 1700 cubic meter per hour could, at best, be compressed to the dimensions of approximately 350 by 200 millimeters due to the spring-back resilience properties of the parts of the filter. Even in case of pelletizing of the pure filter medium without the waste from the frames, a further reduction of the volume is hardly possible. Thus, under the most favorable conditions only up to four comminuted or pressed filter elements of the dimensions mentioned above could be filled into a 200 liter waste container.

Four of such filters combined result in an air volume of 6800 cubic meters per hour which corresponds approximately to the volume passage of the filter in accordance with the invention in the waste container. As compared with the air volume to be filtered of four filter elements of the above example, the system in accordance with the invention is not at all at a disadvantage. On the contrary, the possibility exists to save the cost of not only at least three filter housings with the partially rather complicated technical effort and expenditures, but also the exchange operation and maintenance work for these three installations with the necessary safety measures by using the device in accordance with the invention. In case of the waste containers of a capacity of 400 liters which were also used to date in the nuclear field, the effectiveness of the invention is, of course, much larger.

Another advantage of the invention results due to the possibility to operate, for instance, a 200 liter container already because of the extremely small space requirement of one filter unit and rather for the benefit of a longer service life at preferably only 2000 cubic meters per hour and with the same pressure difference than to date instead of the large air volume to be filtered of more than 6000 cubic meters per hour. In this way the filter service life of 12 to 16 months, which was generally customary to date, can be increased threefold. This, of course, has a favorable effect not only with reference to the decreased frequency of the exchange intervals with the technical safety risk, but also with reference to cost performance matters.

Furthermore, it must be mentioned that the equipment in accordance with the invention allows the manufacturing of a filter unit which can be remote controlled for application in hot cells, which filter unit can function during the exchange phase in a completely automatic fashion without the utilization of expensive telekinetic manipulators with the corresponding operating personnel.

Furthermore, it is of advantage that the waste container can be filled with a filter layer which consumes little pressure; for instance, the waste container can be filled with a granular bulk material layer. This can simultaneously be connected with the utilization of a coarse filter and a fine filter which can be located before or after the granular bulk material layer. This is an advantageous embodiment of a triple effect filter in the smallest space which will practically eliminate at least two filter installations of the type of construction which was customary to date.

Due to the special construction of the stationary domed lids for the convering of the containers with the connecting tubes for supply air and exhaust air which are equipped with a throttle valve, there exists still another advantage insofar that the waste containers with the built-in filter elements can be connected by means of flanges and without special auxiliary equipment to air ducts which are positioned one next to the other or one above the other.

The exchange operation of the suspended filter containers with the aid of a lift truck includes also the solving of the transport problem, since such a transport truck was anyhow necessary to date for the delivery and removal of the filters.

The time loss and the volume reductions and pelletizing operations of the filter elements which had to be performed in rather awkward ways and with extensive safety measures, utilizing saws, shredders or presses and the rooms which are necessary for these operations, including the additional necessary operating personnel, can be saved to a large extent at least for the disposal process in accordance with the invention as far as the filter is concerned. The period of time during which the personnel is exposed to radiation during the filter exchange and during the filter removal is reduced to a minimum, since this process occurs only once during a short stay at the filter. To date, this operation had to be carried out at four different filter installations.

Since the waste containers which were used to date can anyhow only be filled and utilized up to 65% in spite of high pressures and due to the unavoidable air encapsulation and the partially incompressibility of the filter material, the idea in accordance with the invention was not too far fetched to insert the filter element in as compact a form as possible into the waste container, that is, in such a way that approximately 65% of the filter housing or of the waste container is utilized.

Therefore, 35% of the container volume still remains for the unhindered passage of supply air and exhaust air which can be looked upon as sufficient.

For example, it is possible to insert and store a filter package which consists of filter paper in the shape of pockets in a waste container with a volume of 200 liters and with an inner diameter of 560 millimeters and a height of approximately 800 millimeters in such a way that an air volume of approximately 6000 cubic meters per hour can be handled or the correspondingly comparable long service life can be achieved.

The state of the art of the filter disposal which needed to be revised and the problems which were pointed out above of the cumbersome and partially unsafe, expensive and time consuming, exchange, maintenance and disposal operations concerning contaminated filter elements which were customary to date are very substantially reduced utilizing the proposed solving of the objective of the invention, and with the improvement of the degree of safety the danger to the operating personnel and to the environment is reduced as well.

What is claimed is as follows:

1. Filter elements in housings which are equipped with exchange devices and with contamination protection for the precipitation of materials from the breathing air or the process air which could be injurious to health especially for ventilating systems, for example, in the nuclear field, which is concerned with the comminution process and with the removal process of contaminated filter elements for the purpose of storage in preferably subterranean deposite sites by means of special waste containers of round or angular constructional shape characterized by the fact that correspondingly shaped filter elements are received by such housings which consist of internationally commercial, standardized waste containers (1) for nuclear engineering purposes with a capacity of 200 to 400 liters and which housings are equipped with closable standardized lids and which housings are suitable for use with the manipulator and air lock technique and which housings, without changing their outer appearance, are filled with compact filter layers of pocket type folding filter paper, which filter layers are uniformly distributed over the entire inner container cross-section, or which filter layers are offset with reference to each other, or which filter layers are optionally located also one on top of each other, or granular bulk material in the shape of plates, blocks, boards, discs, rings, stars or zig-zags up to an extent of more than 65% of the entire height of the container and the entire volume of the container where during the operating phase of the filter the waste container (1) is freely suspended some distance from the floor (11) at the filter installation (2) and including a domed lid (4) which is equipped with connecting tubes (3) with flanges at the supply air side and at the exhaust air side, which replaces the standardized lid and which domed lid (4) is equipped with test grooves, and which domed lid (4) is tightly connected to the waste container (1) with the inserted filter element, (16), by means of removable bolt systems or with remote controlled lever systems, and which domed lid (4) is solidly connected by means of a flange (6) with each one dusty-air channel and clean-air channel 7, through which channels an airstream is passed, and which channels are located next to each other or one on top of the other; a transparent protective tube (9) between the container flange (1a) and the domed lid flange (4a); for the contamination free manual exchange of a filter, circumventive, self-squeezing elastic known multiple groove rims (8) attached to the container flange (1a) and lid flange (4a) into which the elastic protective tube connection (9) can be squeezed in a known way by means of strings; so that during the exchange phase the waste container (1) can optionally be removed and lowered from the air duct (7) in the area between the floor and the container (11) or it can be lifted up for the purpose of bolting together by means of a lift truck (10).

2. Filter element according to claim 1 characterized by the fact that before exchange of the filter elements, the throttle valves (13) of the supply air tubes and exhaust air tubes (3 and 3a), which throttle valves (13) can be operated by means of the levers (12), are at first closed at the filter installation with the supports (2); and that after removal and lowering of the waste container (1) from the filter installation (2) to the floor (11) or onto a movable transport cart or lift truck (10), the protective tube (9) which connects the domed lid (4) and the waste container (1) is first pulled apart in the middle (14) and then sealed and separated and only after this, the final closing or sealing of the waste container (1) by means of the corresponding standardized lid (15) is performed by means of bolting (5) with simultaneous enclosure of the sealed-off protective tube (9) and the used filter body, (16), which is located in the container (1).

3. Filter element according to claim 2 characterized by the fact that the standardized waste container (1) is filled in its entire height with an air cleaning or gas cleaning, for example, granular bulk material layer in such a way that to the right and to the left of the filter layer, (16), approximately still 25% to 35% filter-free, free space remains for the passage of the supply air (17) and for the passage of the exhaust air (18) in the cross-section of the container (1); and that the domed lid (4), which is connected to this by means of an air passing duct system (19) of the filter installation (16) and which domed lid (4) is optionally equipped with remote controlled operating elements including hydraulic cylinders (20), is tightly separated inside by means of a roof-shaped separation (21) with a test groove device (22)

into one dusty-air space and one clean-air space (24 and 25) to which the connecting tubes (24 and 25) with optional throttle valves (23) which can be remote controlled by means of lifting cylinders (23a) are directly connected where, in the case of the filter exchange, the throttle valves (23) are closed, the lifting cylinders with the geared lever system (20) are opened for the purpose of removal of the hat-shaped domed lid (4) with beveled lid edge and gasket (4a) from the waste container (1), and the lifting cylinder (28) at the bottom positions the container by means of retracting the cylinder platform (29) onto an automatic roller conveyor (30), which roller conveyor is located in a horizontal position and which roller conveyor (30) can optionally be lifted up or lowered onto two movable conveyor belts (31) for the purpose of removal and disposal after it is automatically covered with the standardized lid (15).

4. Filter element in accordance with claim 3 characterized by the fact that the standardized waste container (1) which can be lowered from a filter installation (2) is filled in its entire height up to 65% with a filter layer which is arranged in a star shape, with folding filter paper pockets (32) with large areas, which folding filter paper pockets (32) are arranged around a hollow air entry cross-section cylinder (33); and that the airstream (35) on the clean-air side is passed between the filter pockets (34) from the bottom to the top through a domed lid (36), which domed lid (36) is equipped on the inside with a supply air tube (37) for the dusty air (38), which supply air tube (37) extends in a slanted fashion through the lid space (36) and one end of which supply air tube (37) is equipped with a closable test tube (39) and which end contacts tightly the filter element (32) during the operating phase, whereas the end of the tube (40) which extends through the upper wall of the lid is tightly connected with round (42) or angular (43) tubes by means of flanges (41), and where the exhaust air (35) is removed directly from the domed lid (36) via a tube connection (44), and where a rim is attached for the purpose of contamination-free filter exchange at the container (1) and at the domed lid (36) each into which rim a transparent protective tube (47) can be squeezed.

5. Filter element in accordance with claim 4 characterized by the fact that the inner space of the standardized waste container (1) is filled in its entire height with at least four quadratic zig-zag filter packages in pocket form (48, 49), which filter packages are layered one on top of the other in an alternating fashion in such a way that always two free spaces are created in the container cross-section for the supply airstream (50) and the exhaust airstream (51), which free spaces are located one opposite the other and where it is necessary to seal all four corners of the filter package (48 and 49) at the wall of the container (52) with a sealing material in such a way that, when the domed lid (53) is put on, a diagonal seal (54) is automatically created at the filter package by means of a test groove (55), which diagonal seal (54) extends centrally through the domed lid and which diagonal seal (54) separates the dusty-air space (56) from the clean-air space (57), and the possibility exists by means of two attached connecting tubes (56 and 57) which are equipped with throttle valves (58) to connect these with a supply air channel and an exhaust air channel.

6. Filter element according to claim 5 characterized by the fact that the inner space of the entire height of the standardized waste container is filled, with a board-shaped, compact, zig-zag folding filter package (59) in pocket shape, which folding filter package (59) is uniformly layered by putting one layer on top of the other in such a way that at least 65% of the volume of the container is utilized for this purpose and where above each waste container one hat-shaped domed lid (60) is located, both of which are connected with multiple groove rims (66 and 67) and a protective tube (68 and 69) and which after latching with the container separates the clean-air space (62) from the dusty-air space (63) in a gas-tight fashion by means of a roof-shaped separating part (61) in the shape of a square, which roof-shaped separating part is located inside in the lid and by means of a closable test groove device (64) which is located at the board-shaped filter package (59) and by means of an elastic gasket (65) and where two sides of the container cross-section (59), which sides are located one opposite the other side, are covered and the other sides are open with reference to the filter package (59b).

7. Filter element in accordance with claim 6 characterized by the fact that the waste container (1), after removal of the domed lid (4) from the installation (2), is tightly bolted with a standardized lid (15) which fits the container (1), which waste container (1) contains the board-shaped used filter pocket package (48 and 49) and the gasket (16) in case of contamination and which waste container (1) with the standardized lid (15) is then ready for transport and shipping prior to which operation the remaining free spaces could have been filled additionally, if this was required, with other contaminated waste materials of the nuclear type.

8. Filter element in accordance with claim 7 characterized by the fact that the star-shaped filter pocket package (72) with the prefilter layer (73) in the shape of a hollow cylinder, which filter pocket package (72) was filled into the waste container (1), is closed at the top and at the bottom of the V-shaped pocket sides (76), and the remaining free spaces (75) serve for the passage of the exhaust air and, if necessary, the free spaces (75) serve for the additional filling with other contaminated materials for the disposal.

9. Filter element in accordance with claim 8 characterized by the fact that in order to avoid damage to the protective tube (81) during the exchange of the filter, the rim of the waste container is equipped with cover nuts (79), which cover nuts are closed at the bottom, and which cover nuts are tightly attached by welding, and which cover nuts are located below the rim of the container, and which cover nuts are used instead of the commercial spacer bolts, and the domed lid (4) with the rim (77) or the standardized lid (15) without rim are attached to the rim of the container (1) with the bolts (80) enclosing the contaminated protective bag (81) and the contaminated filter, and where the rim (78), which is located at the container, can directly be transported to a storage site for disposal together with the waste container (1) and disposable parts or for long-term storage.

* * * * *